United States Patent [19]

Blaimschein et al.

[11] 4,110,055
[45] Aug. 29, 1978

[54] TOOL ASSEMBLY AND INSERTED-TOOTH CUTTER FOR MILLING CYLINDRICAL SURFACES ON A WORKPIECE

[75] Inventors: Gottfried Blaimschein; Otto Marzy, both of Steyr, Austria

[73] Assignee: GFM Gesellschaft fur Fertigungstechnik und Maschinenbau Aktiengesellschaft, Steyr, Austria

[21] Appl. No.: 815,647

[22] Filed: Jul. 14, 1977

[30] Foreign Application Priority Data

Jul. 26, 1976 [AT] Austria .................................. 5465/76

[51] Int. Cl.² ........................ B23B 51/00; B26D 1/12
[52] U.S. Cl. ................................ 408/203.5; 90/11 A; 144/252 R; 407/31; 82/20
[58] Field of Search ...................... 408/203.5; 407/31; 82/20; 90/11 A; 144/208 E, 252 R

[56] References Cited

U.S. PATENT DOCUMENTS

| 351,692 | 10/1886 | Dalzell | 408/203.5 |
| 1,978,130 | 10/1934 | Gairing | 408/203.5 |
| 2,665,472 | 1/1954 | Aschwanden et al. | 407/31 |
| 3,673,656 | 7/1972 | Gerchow | 408/203.5 |
| 3,899,814 | 8/1975 | Kralowetz | 408/203.5 |

*Primary Examiner*—Harrison L. Hinson
*Attorney, Agent, or Firm*—Kurt Kelman

[57] ABSTRACT

A carrying drum has an end face and is adapted to be rotatably mounted and to be rotationaly driven. An inserted-tooth cutter comprises an adapter ring flanged to said end face and provided with at least two retainers, which are axially spaced from each other and from said end face, and with radial through openings between adjacent ones of said retainers and between said retainers and said end face. Said inserted-tooth cutter further comprises at least two axially spaced apart, coaxial toothholders, which are adapted to surround said workpiece and are secured to respective ones of said retainers and carry teeth having radially inwardly facing cutting edges.

7 Claims, 4 Drawing Figures

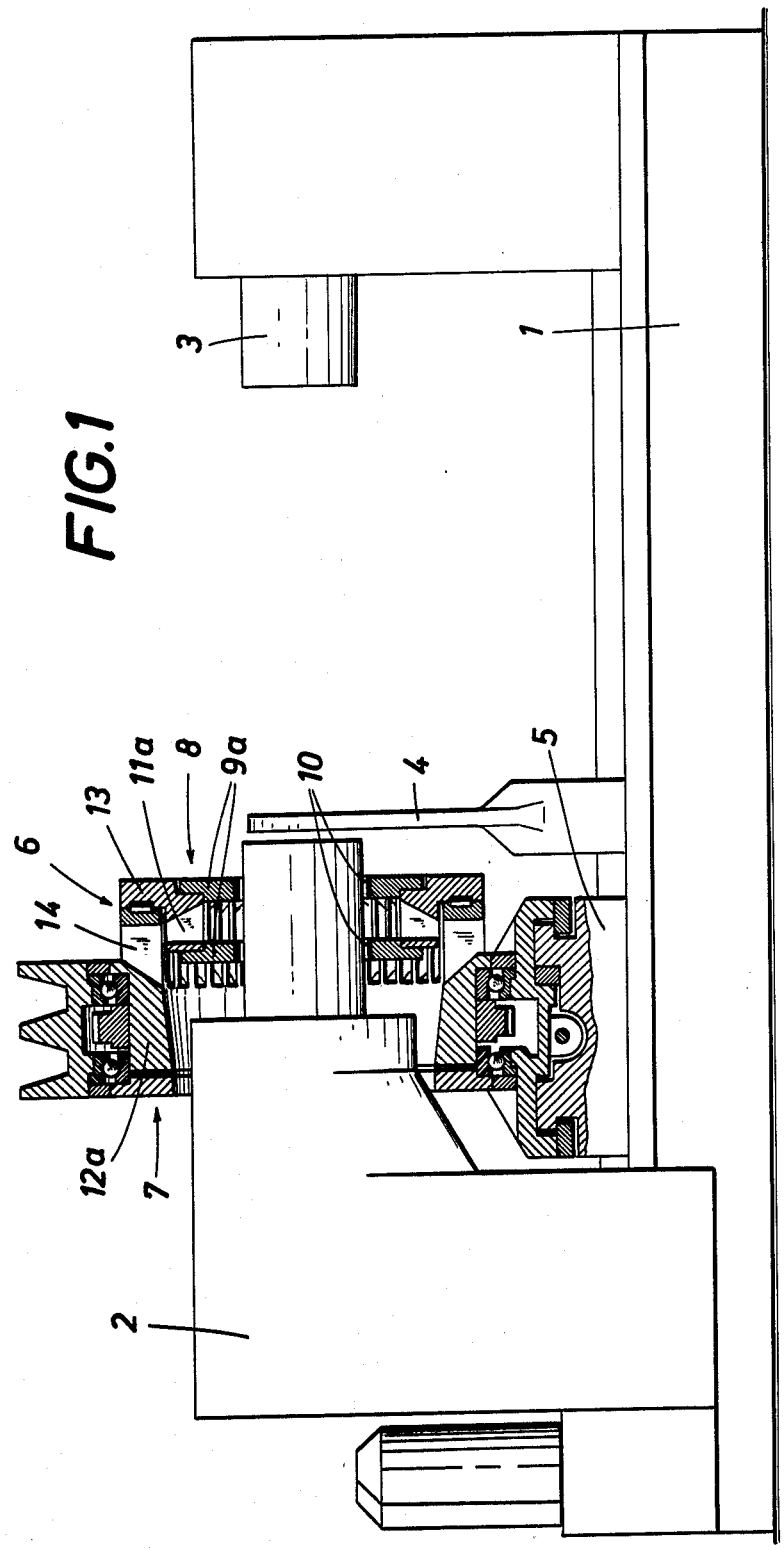

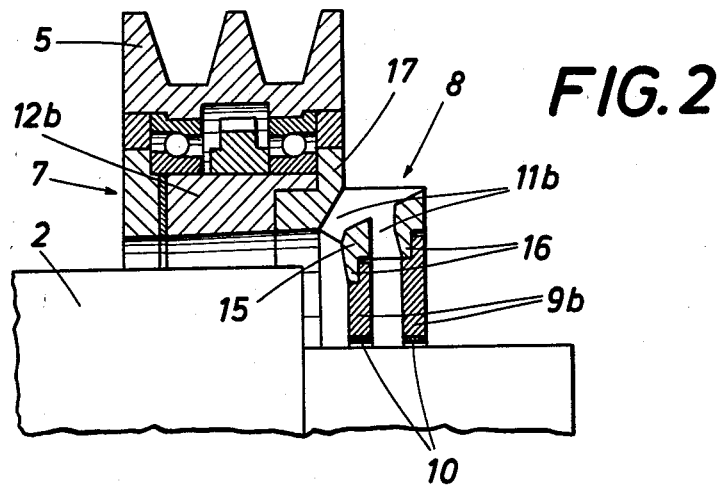
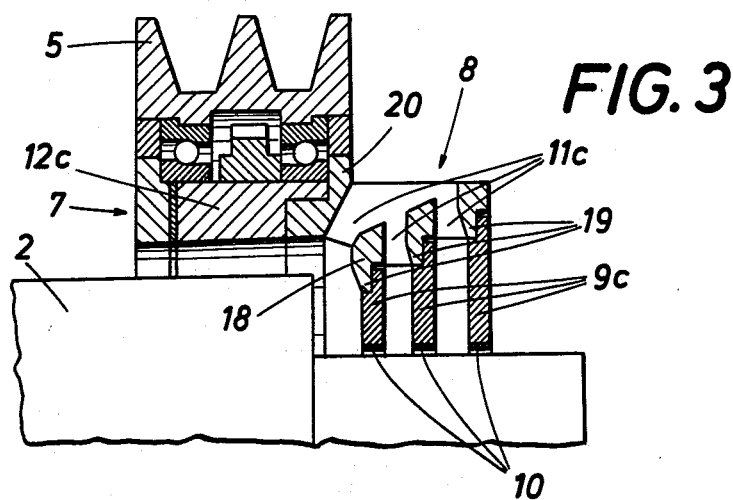
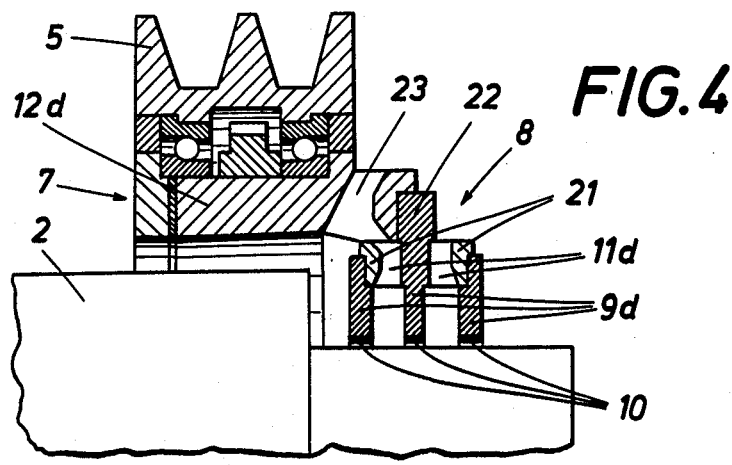

TOOL ASSEMBLY AND INSERTED-TOOTH CUTTER FOR MILLING CYLINDRICAL SURFACES ON A WORKPIECE

This invention relates to a tool for milling cylindrical surfaces on a workpiece, particularly on crankpins of crankshafts, which tool comprises a carrying drum, which is adapted to be rotatably mounted and to be rotationally driven and which carries an inserted-tooth cutter, which is adapted to surround the workpiece and is provided with at least one annular toothholder and radially outwardly extending openings.

In the use of these tools, it is essential that the chips falling into the carrying drum are removed from the latter as quickly as possible and that an overheating of the shell of the drum is prevented. Any chips which remain in the drum would disturb the milling operation and in that case heat would be transferred freely to the drum from the hot chips and from the inserted-tooth cutter, which has been heated as a result of the milling operation, so that thermal expansion results and the drum is no longer mounted exactly in the desired position, the inserted-tooth cutter does no longer run exactly true, and the desired close dimensional tolerances can no longer be maintained in the milling operation. Whereas carrying drums having radial openings have already been provided in order to ensure a rapid removal of chips and to reduce the heat transfer, it has previously been possible to provide these apertured drums only with an inserted-tooth cutter comprising a single toothholder. This has the disadvantage that it takes a relatively long time to machine workpieces which have a plurality of coaxial, similar profiled sections, such as the crankpins of crankshafts, in spite of the fact that it is not necessary to change the tool setting for any of these profiled sections and one and the same control program is sufficient. In view of the difficulties involved in the removal of chips and the temperature rise of the drum, it has previously been usual to provide such milling machines, particularly when used to mill crankshafts, with two or more tool slides and with two or more inserted-tooth cutters, which operate independently of each other and are mounted in separate carrying drums, in order to enable a simultaneous machining of two or more profiled sections.

It is an object of the invention to eliminate these disadvantages and to provide a tool which is of the kind described first hereinbefore and permits of a simultaneous machining of two or more profiled sections of a workpiece without requiring a particularly high expenditure and without involving the risk of a reduction of the quality of the machined workpiece or a disturbance in production.

This object is accomplished according to the invention in that the inserted-tooth cutter comprises an adapter ring, which is detachably flanged to one end of the tool drum and is provided with retainers for two or more spaced apart, coaxial toothholders whereas the adapter ring is formed between these retainers and between the flange and the retainer adjacent thereto with apertures which extend radially through the adapter ring. During the rotation of one and the same inserted-tooth cutter around the workpiece, the latter is machined at a plurality of profiled portions, the number of which is equal to the number of toothholders and which are thus machined to have cross-sections which depend on the flight circles described by the cutting edges of the teeth of the respective toothholders. It will be understood that the toothholders are spaced apart by distances with correspond to the distances between those profiled portions of the workpiece which are to be machined. The chips which fall between the toothholders immediately leave the inserted-tooth cutter through the radial apertures in the adapter ring and cannot become caught between the toothholders and give rise to trouble. The apertures in the adapter ring do not only serve for a removal of chips but decrease also the heat transfer from one toothholder to another and from the inserted-tooth cutter to the carrying drum because these apertures considerably decrease the peripheral cross-section of the adapter ring and the flow of air through the apertures ensures an effective cooling of the inserted-tooth cutter. For this reason the use of the inserted-tooth cutter according to the invention does not result in a disadvantage for the carrying drum regarding the removal of chips and the protection against overheating in comparison with the known inserted-tooth carriers having only a single toothholder. Besides, the provision of apertures in the adapter ring permits of the elimination of the openings in the carrying drum so that the manufacture of the tool is simplified. Moreover, although the inserted-tooth cutter is provided with two or more tooghholders, it facilitates the replacement of teeth and the alterations required for the machining of a different workpiece.

Within the scope of the invention, the retainers of the adapter ring may comprises radially inwardly protruding annular ribs. This design permits of a particularly simple fixation and removal of the several toothholders. It will be understood that the diameters of these annular ribs will be selected so that a plurality of toothholders can be inserted without difficulty.

Particularly with inserted-tooth cutters having two or three toothholders it may be desirable within the scope of the invention to provide a cagelike adapter ring and to provide one toothholder which is mounted in the adapter ring and has an edge portion which radially protrudes from the adapter ring and serves as a fixing flange. In that case the inserted-tooth cutter is very simple in structure in spite of the fact that the adapter ring has large apertures and may be assembled from webs, bolts, intermediate ring.

In a tool which comprises a carrying drum which has a shell formed with radial openings adjacent to that end face of the drum where the latter carries the inserted-tooth cutter, the adapter ring preferably receives a toothholder at each end ot the adapter ring, the latter desirably extends into the drum close to the openings in the shell of the drum and the apertures in the adapter ring conform to said openings. Whereas the use of an inserted-tooth cutter which protrudes into the drum results in a highly compact and stable structure, the shell of the drum must be apertured in that case in order to ensure the removal of chips and the required protection against overheating. The action of these shell openings will not be adversely affected by the inserted-tooth cutter because the latter is matched to these openings so that the chips which fall through the apertures in the adapter ring immediately enter the shell openings and are very quickly removed. The fan action exerted by the shell openings on the drum is not reduced and is utilized also for the inserted-tooth cutter. The adapter ring is preferably designed to receive two toothholders within the scope of the invention but could also carry one or more additional toothholders outside the carrying drum.

Embodiments of the invention are diagrammatically illustrated by way of example on the accompanying drawings, in which FIG. 1 is partly sectional side elevation showing a milling machine provided with a tool according to the invention and FIGS. 2 to 4 are axial sectional views showing embodiments of the tool.

The machine for milling crankshafts comprises a bed 1, gripping heads 2,3, a stay 4 and a tool carriage 5 and is provided with a tool 6. The latter comprises a carrying drum 7, which is mounted in tool slide 5 and adapted to be driven, and an inserted-tooth cutter 8, which is held by the carrying drum 7 and comprises at least two annular toothholders 9a to 9d having inwardly facing cutting edges 10. Between adjacent toothholders 9a to 9b, the inserted-tooth cutter has apertures 11a to 11d, which extend to the outside.

in the embodiment shown in FIG. 3, the tool is similar to that of FIG. 2 but comprises an inserted-tooth cutter 8 having three toothholders 9c. For this reason the adapter ring 18 has three annular ribs 19. The adapter ring 18 is flanged to the drum shell 12c, which is entirely closed. Suitable apertures 11c are provided between the annular ribs and between the flange 20 and the next adjacent annular rib.

FIG. 4 shows a tool in which the inserted-tooth cutter 8 has a cagelike adapter ring 21, which contains three toothholders 9d. The adapter ring consists of two parts. One of the toothholders is held between these two parts and the two other toothholders are fixed to the free end faces of the parts. The intermediate toothholder is also used to secure the inserted-tooth cutter 8 to the carrying drum and for this purpose has a radially outwardly protruding edge portion 22, which consists of a flange that is directly bolted to the carrying drum 7. When the inserted-tooth carrier 8 is provided with a toothholder which is disposed within the drum shell 12d, the latter is again formed with openings 23 and the apertures 11a in that part of the adapter ring which holds the internal toothholder match these openings 23.

What is claimed is:

1. A tool assembly for milling cylindrical surfaces on a workpiece, comprising
   a carrying drum which has an end face and is adapted to be rotatably mounted and to be rotationally driven, and
   an inserted-tooth cutter which comprises an adapter ring detachably flanged to said end face and provided with at least two retainers which are axially spaced from each other and from said end face, and with radial through openings between adjacent ones of said fixing means and between said retainers and said end face,
   said inserted-tooth cutter further comprising at least two axially spaced apart, coaxial toothholders, which are adapted to surround said workpiece and are secured to respective ones of said retainers and carry teeth having radially inwardly facing cutting edges.

2. A tool assembly as set forth in claim 1, in which said retainers comprise radially inwardly protruding ribs.

3. A tool assembly as set forth in claim 1, in which
   said adapter ring has a structure like a cage and
   one of said toothholders has an edge portion which protrudes radially outwardly from said adapter ring and constitutes a flange, which is secured to said end face.

4. A tool assembly as set forth in claim 1, in which
   said drum has a shell formed with radial through openings adjacent to said end faces,
   said adapter ring protrudes axially into said drum close to said openings in said shell, and
   said radial through openings in said adapter ring conform to those in said shell.

5. A tool assembly as set forth in claim 4, in which said adapter ring is provided with one of said retainers and one of said toothholders at each of its end faces.

6. An inserted-tooth cutter for milling circular sections of a workpiece in a machine which comprises a carrying drum, which has an end face and is rotatably mounted and adapted to be rotationally driven, said inserted-tooth cutter comprising
   an adapter ring adapted to be detachably flanged to said end face and provided with at least two retainers, which are axially spaced from each other and from said end face, and with radial through openings between adjacent ones of said retainers and between said retainers and said end face,
   said inserted-tooth cutter further comprising at least two axially spaced apart, coaxial toothholders, which are adapted to surround said workpiece and are secured to respective ones of said retainers and carry teeth having radially inwardly facing cutting edges.

7. An inserted-tooth cutter as set forth in claim 6, in which said retainers comprise radially inwardly protruding ribs.

* * * * *